US012761701B2

(12) United States Patent
Griffin

(10) Patent No.: US 12,761,701 B2
(45) Date of Patent: Oct. 13, 2026

(54) SMART MIRROR SYSTEM

(71) Applicant: Valerie Griffin, Crystal, MN (US)

(72) Inventor: Valerie Griffin, Crystal, MN (US)

( * ) Notice: Subject to any disclaimer, the term of this patent is extended or adjusted under 35 U.S.C. 154(b) by 346 days.

(21) Appl. No.: 18/377,581

(22) Filed: Oct. 6, 2023

(65) Prior Publication Data

US 2025/0117051 A1 Apr. 10, 2025

(51) Int. Cl.
*G06F 1/16* (2006.01)
*G02B 7/182* (2021.01)

(52) U.S. Cl.
CPC ........... *G06F 1/1681* (2013.01); *G02B 7/182* (2013.01)

(58) Field of Classification Search
CPC .............................. G06F 1/1681; G02B 7/182
USPC .................................................. 359/839, 871
See application file for complete search history.

(56) References Cited

U.S. PATENT DOCUMENTS

| | | | | |
|---|---|---|---|---|
| 3,273,891 A * | 9/1966 | Grim, Jr. | A63B 69/3685 356/255 |
| 4,202,607 A * | 5/1980 | Washizuka | G04G 17/08 349/58 |
| 5,210,967 A | 5/1993 | Brown | |
| 6,560,027 B2 | 5/2003 | Meine | |
| 7,455,412 B2 * | 11/2008 | Rottcher | G09F 13/12 40/900 |
| 7,589,893 B2 * | 9/2009 | Rottcher | G09F 15/00 345/24 |
| 7,805,260 B2 * | 9/2010 | Mischel, Jr. | G09F 9/00 362/135 |
| 8,880,360 B2 | 11/2014 | Mischel, Jr. | |
| 8,910,402 B2 * | 12/2014 | Mischel, Jr. | G09F 19/14 362/135 |
| 11,099,540 B2 * | 8/2021 | Bradley | B05B 12/12 |
| 2002/0196333 A1 | 12/2002 | Gorischek | |
| 2006/0022938 A1 | 2/2006 | Allen | |
| 2007/0013278 A1 * | 1/2007 | Herber | A47B 67/005 312/227 |
| 2016/0070085 A1 * | 3/2016 | Mischel, Jr. | G09F 9/00 29/428 |
| 2017/0181541 A1 * | 6/2017 | Stanley, Jr. | H02J 7/0042 |
| 2018/0032227 A1 * | 2/2018 | Broxson | G06F 1/1605 |
| 2020/0085170 A1 * | 3/2020 | Yang | A45D 42/10 |

FOREIGN PATENT DOCUMENTS

EP 3288011 4/2016

* cited by examiner

*Primary Examiner* — Jennifer D. Carruth

(57) ABSTRACT

A smart mirror system for selectively positioning a smart device behind a one-way mirror to simultaneously view a display of the smart device and a reflection includes a housing having a front panel, a back panel, and a perimeter wall extending between the front panel and the back panel to define an interior space. The front panel includes a one-way mirror having an outer side and an inner side. The inner side faces the interior space. The outer side functions as a mirror. Light is transmittable from the interior space through the one-way mirror. The back panel has a non-reflective interior surface. A receiver mounted within the interior space removably receives the electronic device such that the display faces the one-way mirror, whereby the display is visible through the one-way mirror.

8 Claims, 8 Drawing Sheets

SMART MIRROR SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to mirror and media display systems and more particularly pertains to a new mirror and media display system for selectively positioning a smart device behind a one-way mirror to simultaneously view a display of the smart device and a reflection within the mirror.

(2) Description of Related Art Including Information Disclosed Under 37 CFR 1.97 and 1.98

The prior art relates to mirror and media display systems. Some prior art references disclose one-way mirror devices that include an integrated computing device. In such devices, the computing device can display an image through the one-way mirror while the one-way mirror is reflecting an object. For example, the prior art provides references of smart vanity mirrors in front of which a user can perform personal grooming tasks while watching videos or checking news headlines with the integrated computing device. Other references disclose smart mirrors that have integrated computing devices for displaying exercise videos, enabling the user to watch and follow along with the exercise videos while exercising in front of the mirror. Typically, these smart mirrors have computing devices that are permanently coupled to the mirror or integrated within the device. These smart mirrors also typically have stabilized or permanent areas wherein the display of the computing device can be viewed. Thus, there is a need in the art for a smart mirror display system that can be used with a personal electronic device of the user, wherein the user can selectively position the personal electronic device behind the mirror. There is also a need in the art for a smart mirror system allowing the user to change the position or location of the electronic device, such that the electronic device can be viewed through a plurality of areas within the one-way mirror.

BRIEF SUMMARY OF THE INVENTION

An embodiment of the disclosure meets the needs presented above by generally comprising a smart mirror system for use with an electronic device of a user. The electronic device has a screen that is illuminated by the electronic device to portray a display. The smart mirror system also includes a housing having a front panel, a back panel, and a perimeter wall extending between the front panel and the back panel to define an interior space between the front panel and the back panel. The front panel includes a one-way mirror having an outer side and an inner side. The inner side faces the interior space, whereupon the outer side functions as a mirror and light is transmittable from the interior space through the one-way mirror. The back panel has an interior surface that is substantially non-reflective. A receiver is mounted within the interior space. The receiver removably receives the electronic device such that the display faces the one-way mirror, whereby the illuminated screen is visible through the one-way mirror. The receiver can be selectively positioned on the back panel and is removably attached to the back panel with a connector. The connector includes a first portion substantially covering the back panel and a second portion positioned on the receiver. Embodiments of the connector may comprise a hook and loop connector.

There has thus been outlined, rather broadly, the more important features of the disclosure in order that the detailed description thereof that follows may be better understood, and in order that the present contribution to the art may be better appreciated. There are additional features of the disclosure that will be described hereinafter, and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
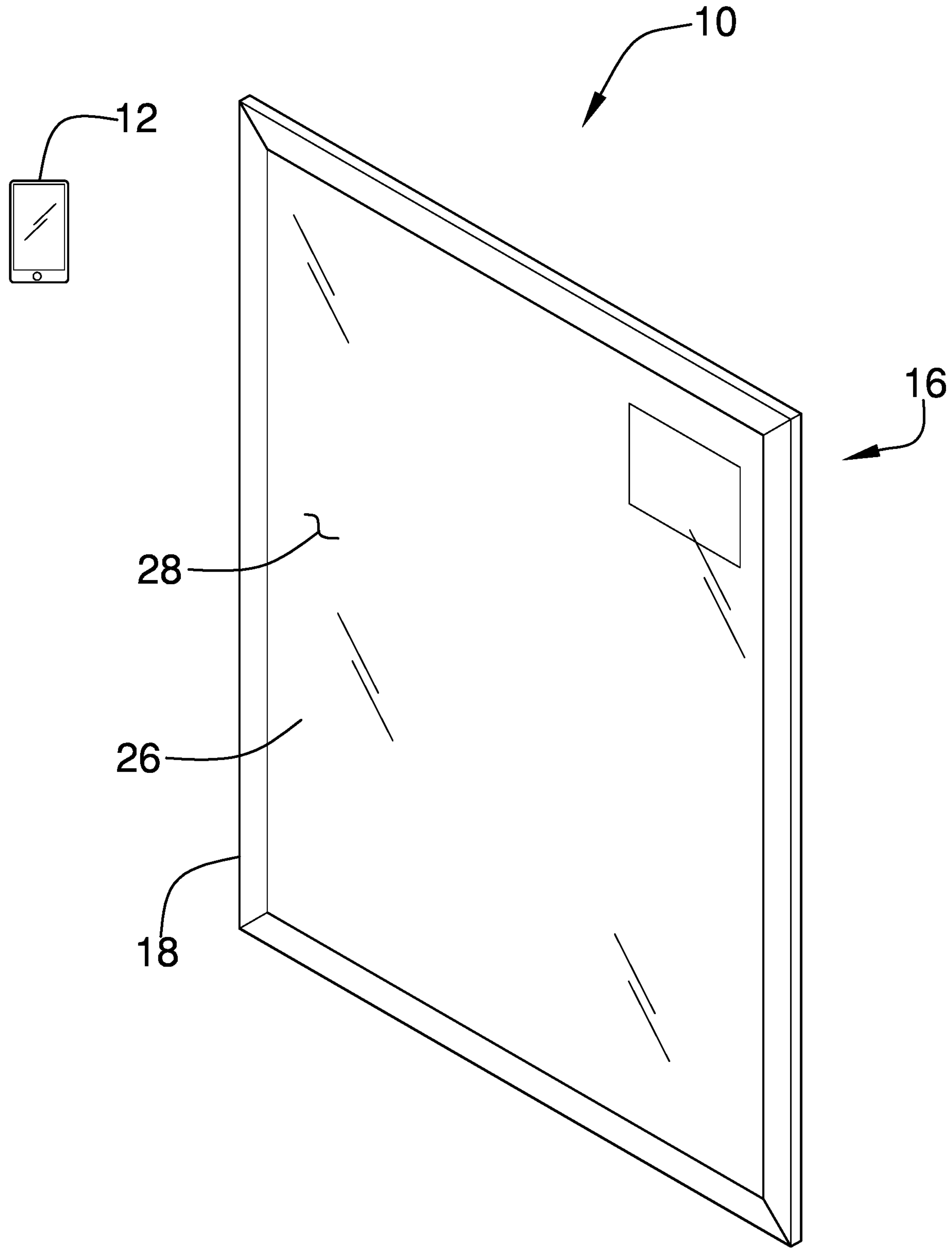
FIG. 1 is a front isometric view of a smart mirror system according to an embodiment of the disclosure.
Figure 2:
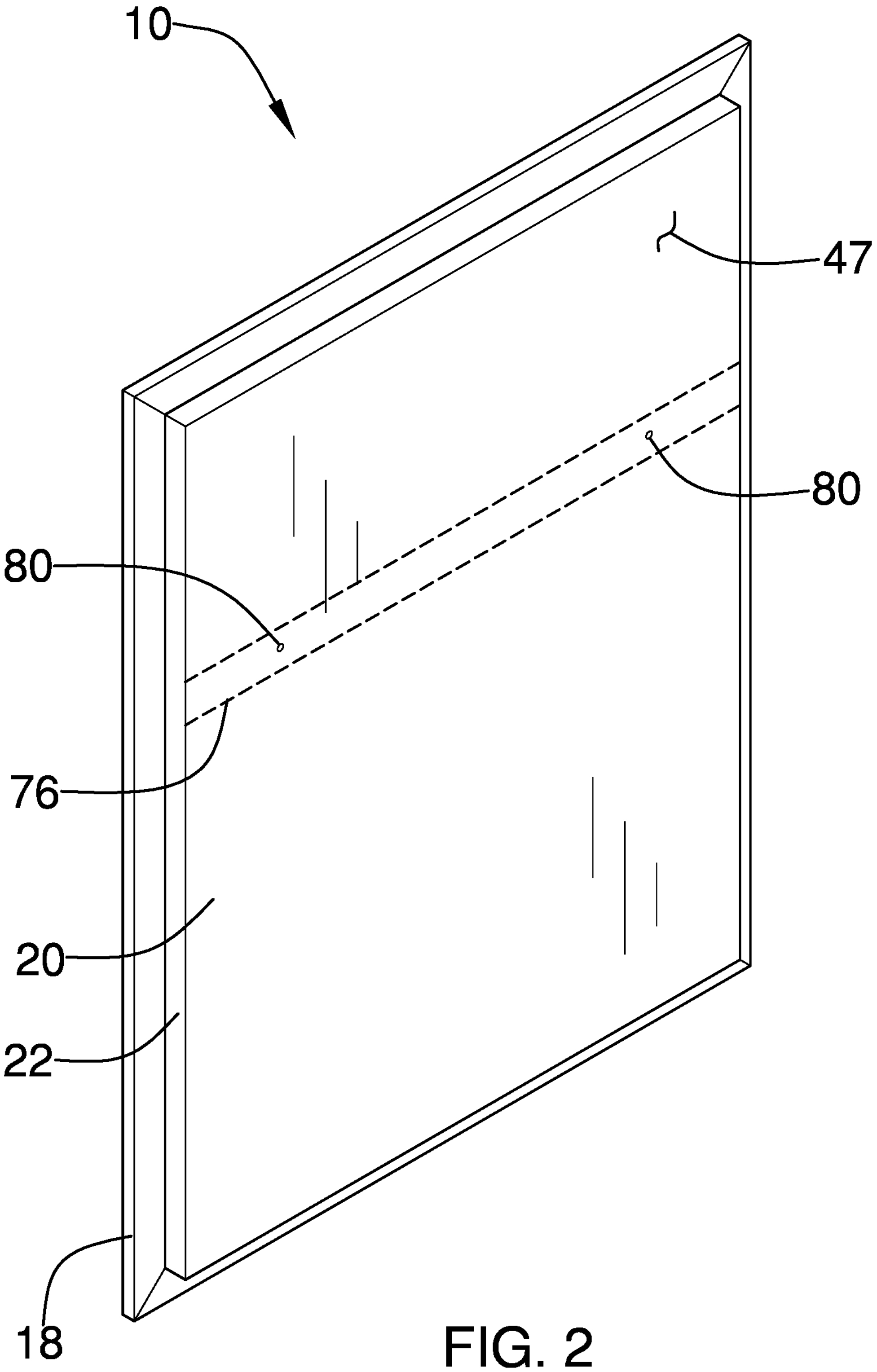
FIG. 2 is a rear isometric view of an embodiment of the disclosure.
Figure 3:
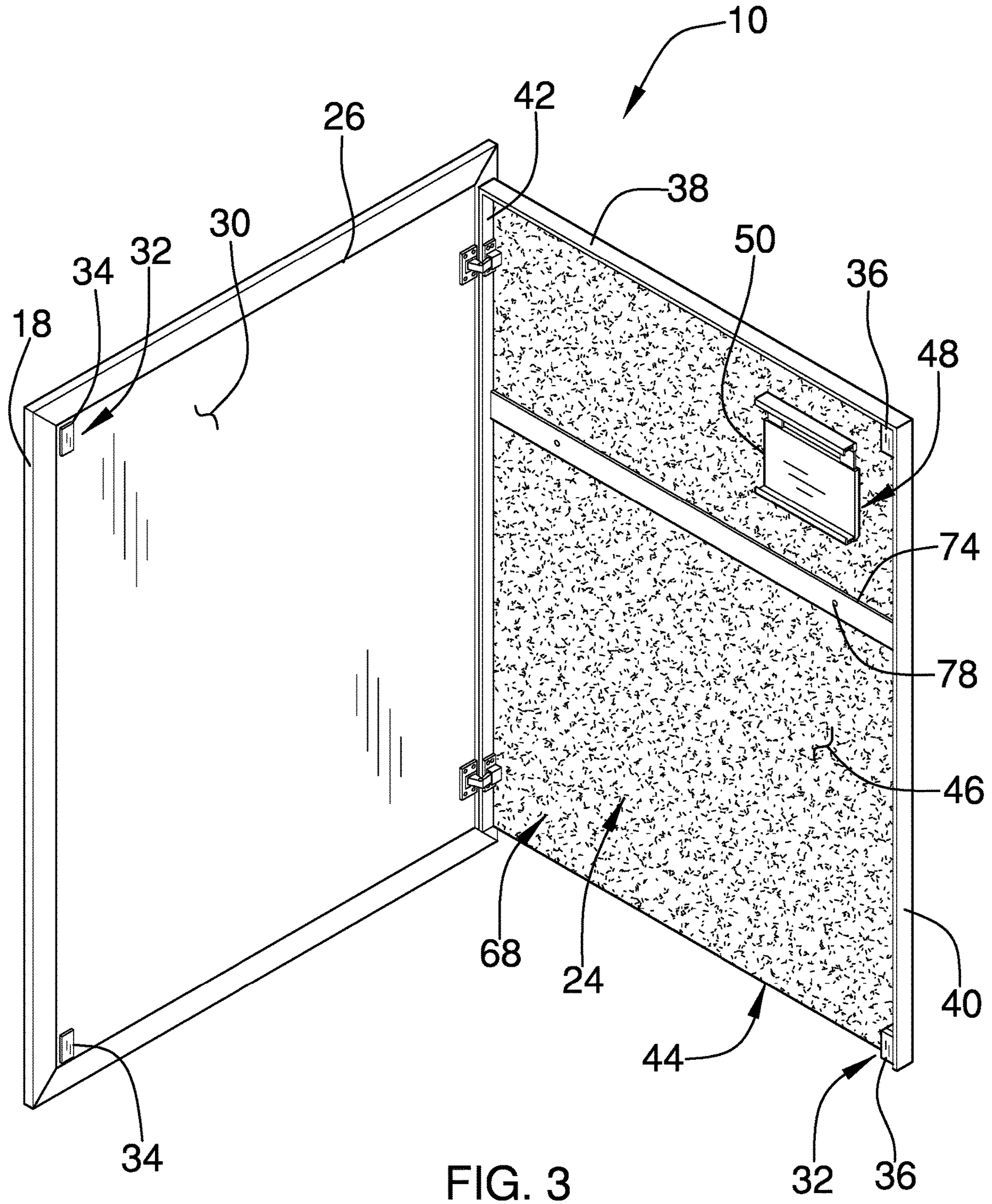
FIG. 3 is a front view of an embodiment of the disclosure.
Figure 4:
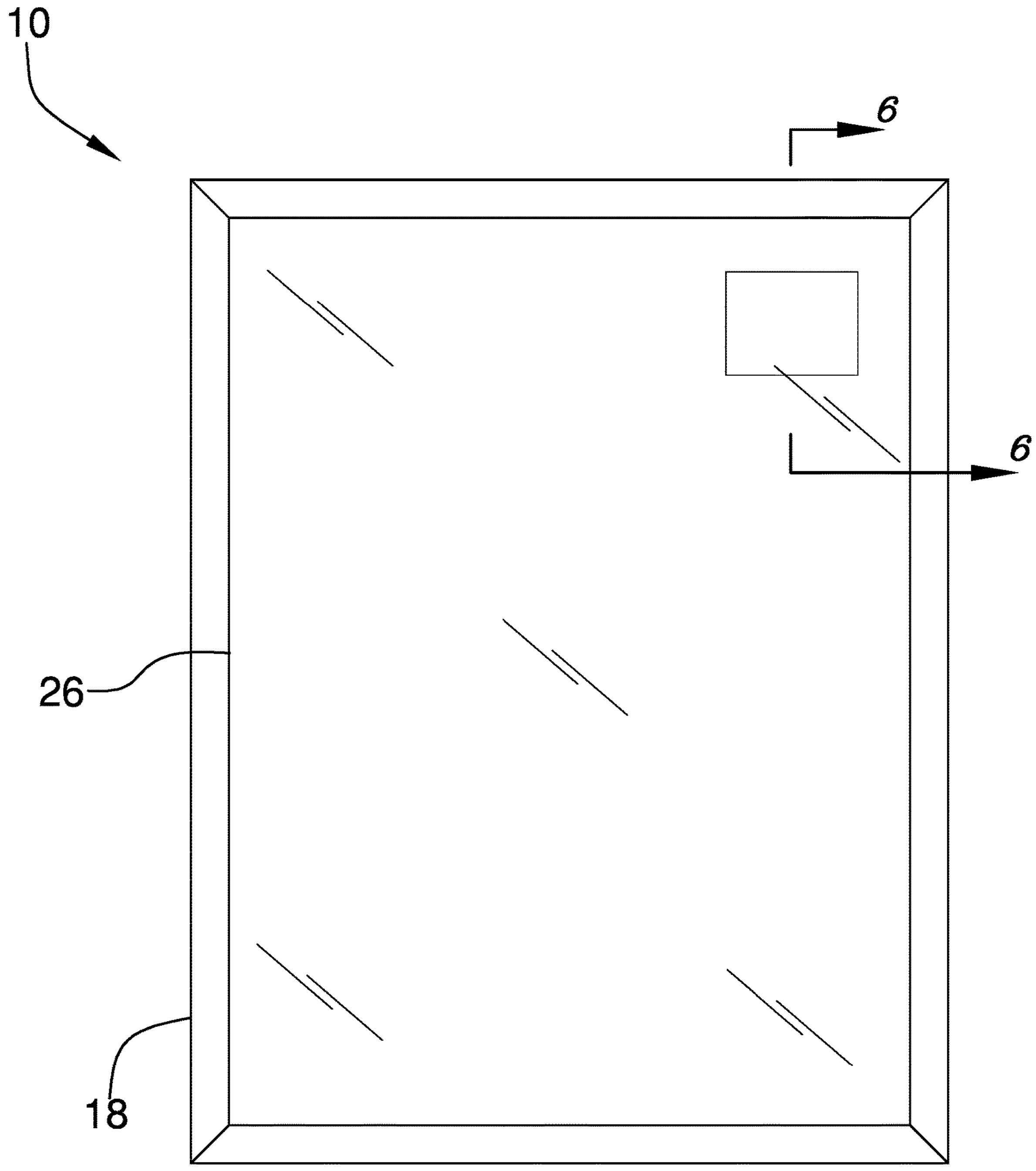
FIG. 4 is a front view of an embodiment of the disclosure.
Figure 5:
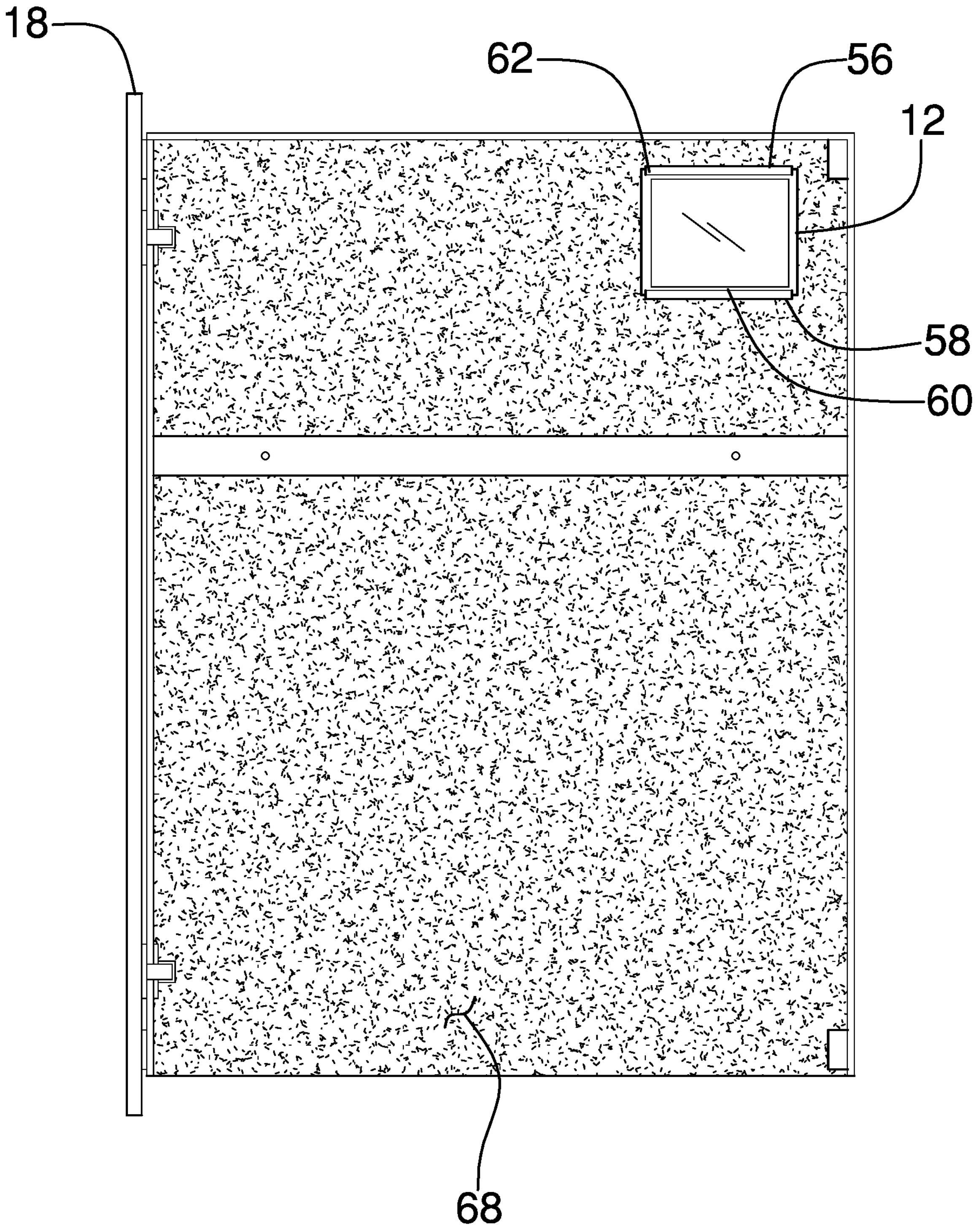
FIG. 5 is a front view of an embodiment of the disclosure.
Figure 6:
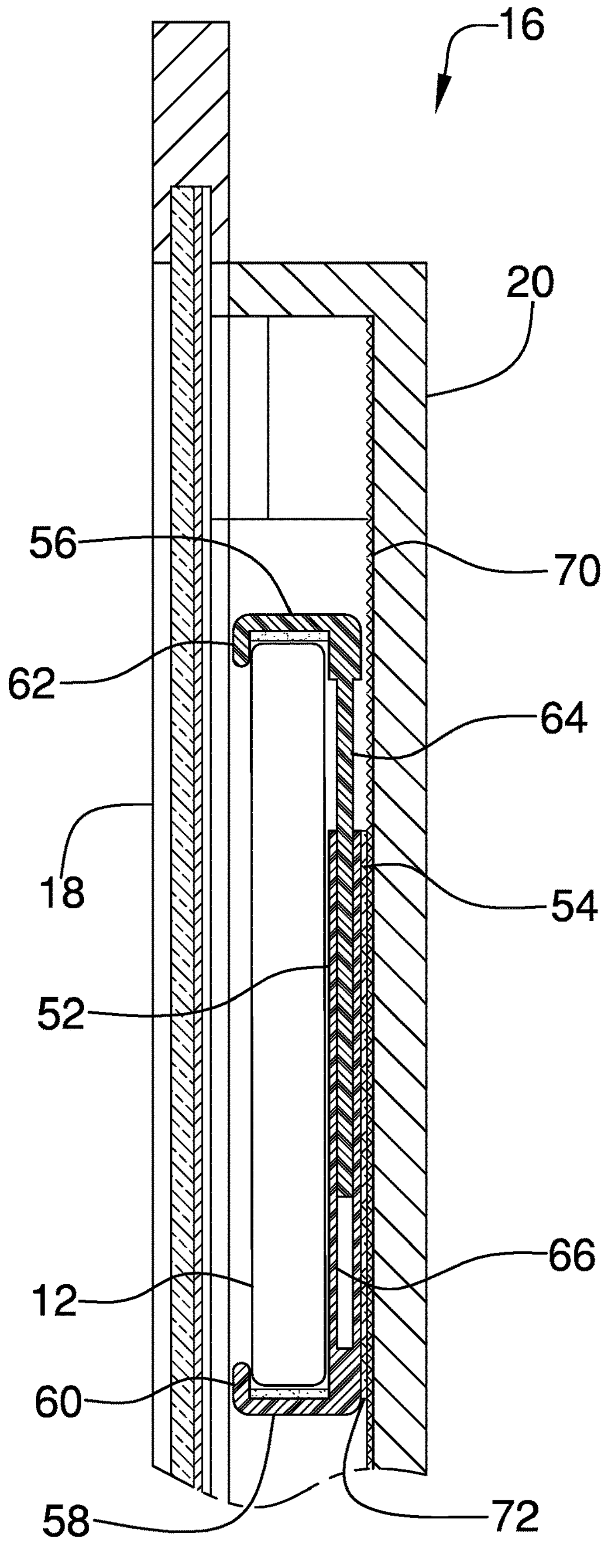
FIG. 6 is a cross-sectional view of an embodiment of the disclosure.
Figure 7:
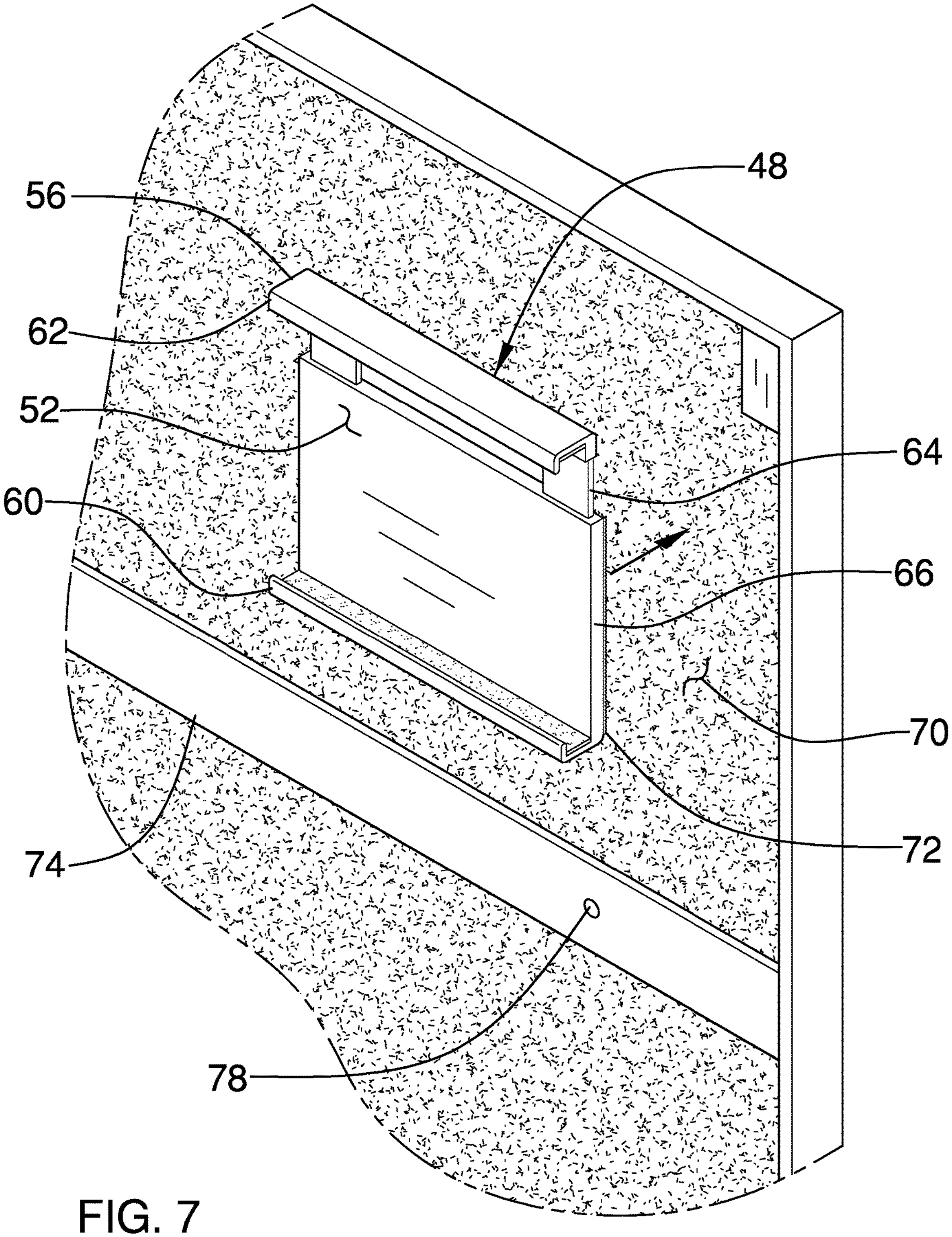
FIG. 7 is a detailed isometric view of an embodiment of the disclosure.

With reference now to the drawings, and in particular to FIGS. 1 through 8 thereof, a new mirror and media display system embodying the principles and concepts of an embodiment of the disclosure and generally designated by the reference numeral 10 will be described.

As best illustrated in FIGS. 1 through 8, the smart mirror system 10 generally comprises an electronic device 12 having a screen. The screen can be illuminated by the electronic device 12 to portray a display 14. Examples of the electronic device 12 include a smartphone or a tablet.

The smart mirror system 10 also includes a housing 16 having a front panel 18, a back panel 20, and a perimeter wall 22 extending between the front panel 18 and the back panel 20 to define an interior space 24 between the front panel 18 and the back panel 20. In some embodiments, the front panel 18 is hingedly attached to the perimeter wall 22, thereby permitting access the interior space 24. The electronic device 12 can be positioned within the interior space 24 so that the display 14 is viewable within the front panel 18.

Figure 8:
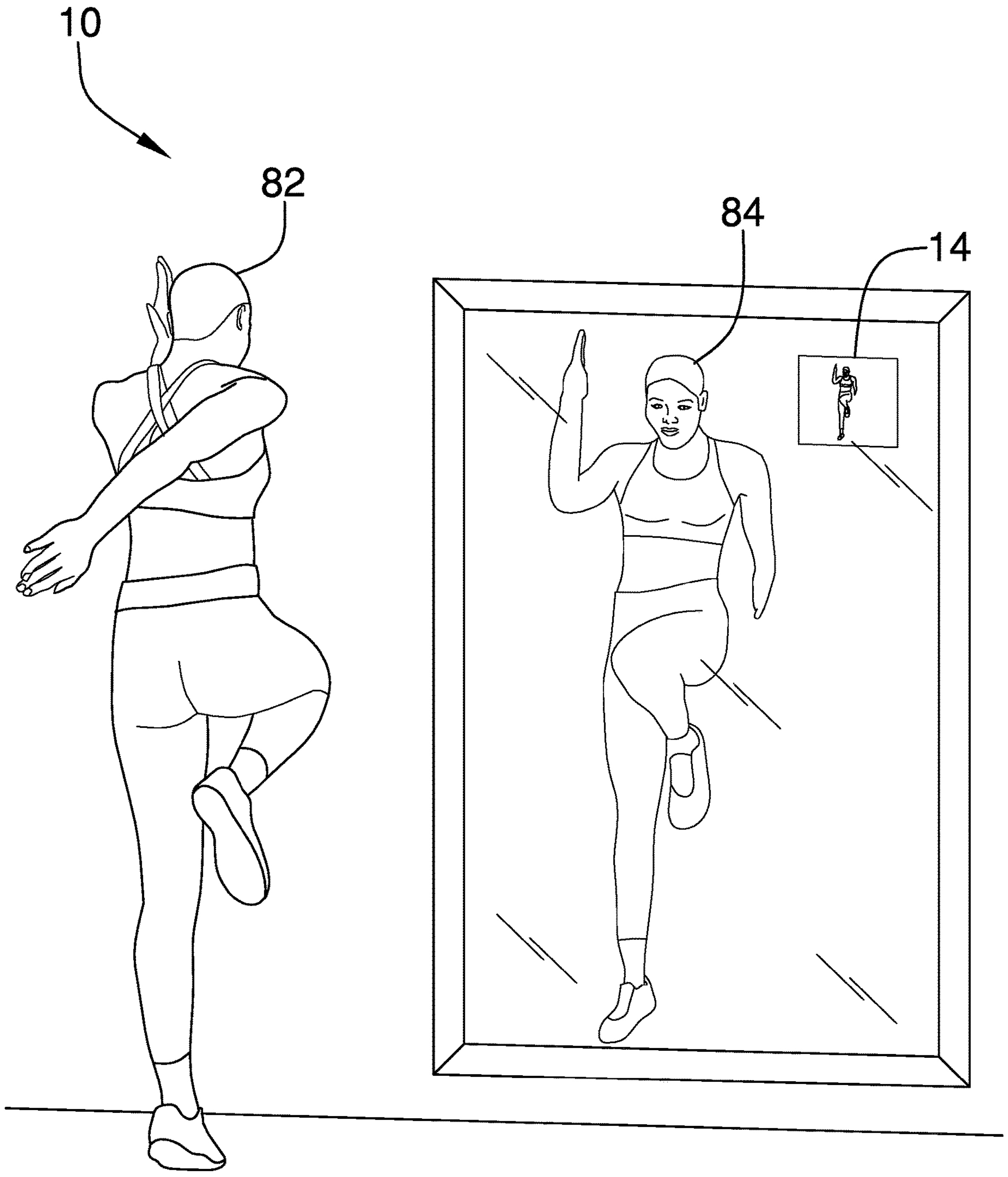
FIG. 8 is an in-use view of an embodiment of the disclosure.

The front panel 18 comprises a one-way mirror 26 having an outer side 28 and an inner side 30. The inner side 30 faces the interior space 24, whereupon the outer side 28 functions as a mirror and light is transmittable from the interior space 24 through the one-way mirror 26. More specifically, when the electronic device 12 is positioned within the interior space 24 such that the illuminated screen is facing the front panel, the display 14 is visible through the one-way mirror 26 while the outer side 28 simultaneously functions as a mirror to portray a reflection, as shown in FIG. 8.

A closure 32 may be attached to the housing 16 and configured to releasably secure the front panel 18 against the perimeter wall 22 in a closed position. One example of the closure comprises a first magnetically active material 34 that is positioned on the front panel 18 and a second magnetically active material 36 that is positioned on the perimeter wall 22 in alignment with the first magnetically active material 34 when the front panel 18 is in the closed position. The first 34 and second 36 magnetically active materials are configured to be magnetically attached to each other, thereby releasably securing the front panel 18 to the perimeter wall 22. For example, the first 34 and second 36 magnetically active materials may both comprise magnets having complementary polarity such that the first 34 and second 36 magnetically active materials are magnetically attracted to each other. In another example, one of the first 34 and second 36 magnetically active materials may comprise a magnet and the other of the first 34 and second 36 magnetically active materials may comprise a soft or hard magnetic material that is magnetically attracted to that magnet. Releasing the first 34 and second 36 magnetically active materials permits the front panel 18 to open outwardly from the perimeter wall 22, thereby permitting access to the interior space 24.

In some embodiments, the perimeter wall 22 includes a top edge 38, a first side edge 40, and a second side edge 42. The first 40 and second 42 side edges extend downwardly from the top edge 38. In such embodiments, the perimeter wall 22 may also have a bottom edge 44 opposite the top edge 38. The bottom edge 44 may define an opening extending into the interior space 24. The opening may provide an additional or alternative means of accessing the interior space 24.

The back panel 20 has an interior surface 46 that is substantially non-reflective. In other words, the interior surface 46 has a low enough reflectance that the front panel 18 can act as a mirror when the front panel 18 is in the closed position. For example, the interior surface 46 may comprise a dark color, a black color, or a flat coating that does not reflect light very well.

A receiver 48 is mountable within the interior space 24. The receiver 48 removably receives the electronic device 12 such that the display 14 faces the one-way mirror 26. The receiver 48 may be any device configured to hold and secure the electronic device 12 within the interior space 24. For example, the receiver 48 may include a plate 50 having a first side 52 and a second side 54. The plate 50 may also have a top edge 56 and a bottom edge 58. A lower lip 60 may be attached to the bottom edge 58 and an upper lip 62 may be attached to the top edge 56, wherein the electronic device 12 is held between the lower 60 and upper 62 lips. In some embodiments, the plate 50 may be extendable, for example vertically from the top edge 56 to the bottom edge 58, thereby altering a height of the plate 50. Such embodiments of the plate 50 may include a first section 64 and a second section 66 that are telescopically engaged with each other. Because the plate 50 is extendable, the plate 50 can accommodate a range of sizes of electronic devices 12. The user 82 can accordingly use any electronic device 12 that the user 82 already owns or prefers with the smart mirror system 10.

The receiver 48 may be selectively positioned, or positionable, on the back panel 20. In such embodiments, the user 82 can position the electronic device 12 anywhere within the interior space 24. For example, the user 82 may want to position the electronic device 12 at the top right of the one-way mirror 26 when watching the display 14 during an exercise routine, as shown in FIG. 8. The user 82 may alternatively want to position the electronic device 12 in a different corner based on viewing preferences or activities being performed with the smart mirror. Thus, the receiver 48 can be removably attached to the back panel 20 with a connector 68. The connector 68 may include a first portion 70 substantially covering the back panel 20 and a second portion 72 positioned on the receiver 48. Examples of the connector 68 include a hook and loop connector, magnetically active materials, suction cups and a smooth, non-porous surface on the back panel 20, or a peg board. When the connector 68 substantially covers the back panel 20, the receiver 48 can be positioned in nearly any location on the back panel 20.

Because the user 82 may want to hang the smart mirror system 10 on a wall or other surface, the smart mirror system 10 may further include a brace 74 that is attached to the back panel 20. The brace 74 facilitates securing the housing 16 to the wall or other surface. One embodiment of the brace 74 generally comprises a reinforced plate 76 extending across the back side 20. The reinforced plate 76 may be positioned on the interior surface 46 within the interior space 24, or on the opposing exterior surface 47 of the back panel 20. The reinforced plate 76 may have a plurality of plate apertures 78 extending therethrough. The back panel 20 may have a plurality of panel apertures 80 extending therethrough that are aligned with the plurality of plate apertures 78. Nails, screws, or other fasteners can be inserted through the plurality of plate 78 and panel 80 apertures to securely hang the smart mirror system 10 on the wall or other surface.

In use, the user 82 can open the front panel 18 from the perimeter wall 22 and secure the electronic device 12 within the receiver 48. The user 82 can then position the receiver 48 and electronic device 12 anywhere along the interior surface 46 of the back panel 20. Once the front panel 18 is returned to the closed position, the illuminated screen will show the display 14 through the one-way mirror 26 while the one-way mirror 26 also provides a reflection 48 of the user 82 or another object positioned in front of the smart mirror system 10. In embodiments where the bottom edge 44 defines an opening into the interior space 24, the user 82 can position the receiver 48 on the back panel 20 through the opened bottom edge 44, rather than opening the front panel 18.

The viewability of the display 14 within the one-way mirror 26 may improve by ensuring that the screen is illuminated brightly, for example by turning the screen to the highest brightness setting. The viewability of the display 14 may also be improved by minimizing the reflectiveness of the interior surface 46 and by ensuring that the interior surface 46 is a dark, flat color. The viewability of the display 14 may also be improved by positioning the screen as closely as possible to the front panel 18 when the electronic device 12 is positioned within the housing 16. In such a position, the user 82 may be able to record or take pictures through the one-way mirror using a camera on the electronic device 12. Because the front panel 18 comprises a one-way mirror 26, the camera should be able to see through the front panel 18 to capture images of objects that are in front of the smart mirror system 10. For example, the user 82 could set a timer on the camera to capture an image after the electronic device 12 has been securely positioned on the back panel 20, or the user 82 could use a remote device such as a smart watch to control the camera.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A smart mirror system comprising:

an electronic device having a screen, the screen being illuminated by the electronic device to portray a display;

a housing having a front panel, a back panel, and a perimeter wall extending between the front panel and the back panel to define an interior space between the front panel and the back panel;

the front panel comprising a one-way mirror having an outer side and an inner side, the inner side facing the interior space, whereupon the outer side functions as a mirror and light is transmittable from the interior space through the one-way mirror;

the back panel having an interior surface being substantially non-reflective;

a receiver being mountable within the interior space and removably receiving the electronic device such that the display faces the one-way mirror;

the receiver being selectively positioned on the back panel and removably attached to the back panel with a connector, the connector including a first portion substantially covering the back panel and a second portion positioned on the receiver, the connector comprising a hook and loop connector, the receiver further comprising:

a plate having a first side and a second side, the plate having a top edge and a bottom edge;

a lower lip being attached to the bottom edge;

an upper lip being attached to the top edge, wherein the electronic device is held between the lower and upper lips.

2. The smart mirror system of claim 1, wherein the front panel is hingedly attached to the perimeter wall to access the interior space.

3. The smart mirror system of claim 2, further comprising a closure being attached to the housing and being configured to releasably secure the front panel against the perimeter wall in a closed position, the closure including:

a first magnetically active material being positioned on the front panel; and a second magnetically active material being positioned on the perimeter wall in alignment with the first magnetically active material when the front panel is in the closed position.

4. The smart mirror system of claim 1, the perimeter wall further comprising:

a top edge, a first side edge, and a second side edge, the first and second side edges extending downwardly from the top edge; and a bottom edge opposite the top edge, the bottom edge defining an opening extending into the interior space.

5. The smart mirror system of claim 1, wherein the interior surface of the back panel is a black color.

6. The smart mirror system of claim 1, wherein the interior surface of the back panel is a dark color.

7. The smart mirror system of claim 1, wherein the plate is extendable vertically from the top edge to the bottom edge to alter a height of the plate, the plate including a first section and a second section being telescopically engaged with each other.

8. A smart mirror system comprising:

an electronic device having a screen, the screen being illuminated by the electronic device to portray a display;

a housing having a front panel, a back panel, and a perimeter wall extending between the front panel and the back panel to define an interior space between the front panel and the back panel, the front panel being hingedly attached to the perimeter wall to access the interior space;

the front panel comprising a one-way mirror having an outer side and an inner side, the inner side facing the interior space, whereupon the outer side functions as a mirror and light is transmittable from the interior space through the one-way mirror;

a closure being attached to the housing and being configured to releasably secure the front panel against the perimeter wall in a closed position, the closure comprising:

a first magnetically active material being positioned on the front panel;

a second magnetically active material being positioned on the perimeter wall in alignment with the first magnetically active material when the front panel is in the closed position;

the perimeter wall including:

a top edge, a first side edge, and a second side edge, the first and second side edges extending downwardly from the top edge;

a bottom edge opposite the top edge, the bottom edge defining an opening extending into the interior space;

the back panel having an interior surface being substantially non-reflective;

a receiver being mounted within the interior space and removably receiving the electronic device such that the display faces the one-way mirror, the receiver including:

a plate having a first side and a second side, the plate having a top edge and a bottom edge;

a lower lip being attached to the bottom edge;

an upper lip being attached to the top edge, wherein the electronic device is held between the lower and upper lips;

the plate being extendable vertically from the top edge to the bottom edge to alter a height of the plate, the plate including a first section and a second section being telescopically engaged with each other; and the receiver being selectively positionable on the back panel and removably attachable to the back panel with a connector, the connector including a first portion substantially covering the back panel and a second portion positioned on the receiver, the connector comprising a hook and loop connector.

* * * * *